Sept. 20, 1932.  H. L. KRAEFT  1,878,528

WHEEL CONSTRUCTION

Filed Oct. 30, 1931

Inventor
Herman L. Kraeft
By Bates, Golrick & Teare
Attorneys

Patented Sept. 20, 1932

1,878,528

UNITED STATES PATENT OFFICE

HERMAN L. KRAEFT, OF CLEVELAND, OHIO, ASSIGNOR TO THE MURRAY OHIO MANUFACTURING COMPANY, OF CLEVELAND, OHIO, A CORPORATION OF OHIO

WHEEL CONSTRUCTION

Application filed October 30, 1931. Serial No. 572,050.

This invention relates to a wheel construction, and especially to an improved wheel of the wire spoke type, which is especially adapted for use on juvenile vehicles.

The primary object of the invention is to provide an improved and simplified hub construction for a juvenile vehicle wheel. A further object is to provide a hub construction for a wheel of the wire spoke type, in which the joints between the spokes and the hub will be concealed from view. A further object is to provide a wire spoke wheel with a hub construction, which will tension the spokes and maintain them in alignment.

Further objects and features of the invention will become apparent from the following description, relating to the accompanying drawing, wherein I show a preferred embodiment of my invention. The essential characteristics of the invention will be summarized in the claim.

Figure 1:
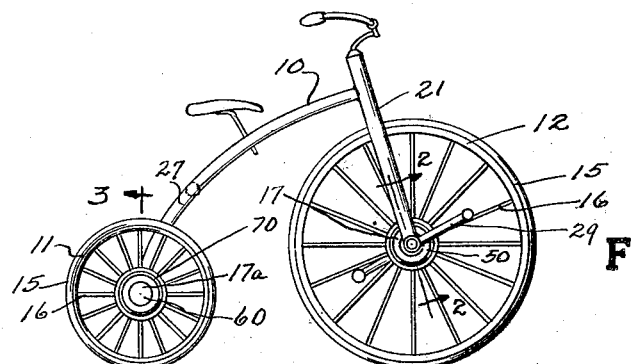
Figure 2:
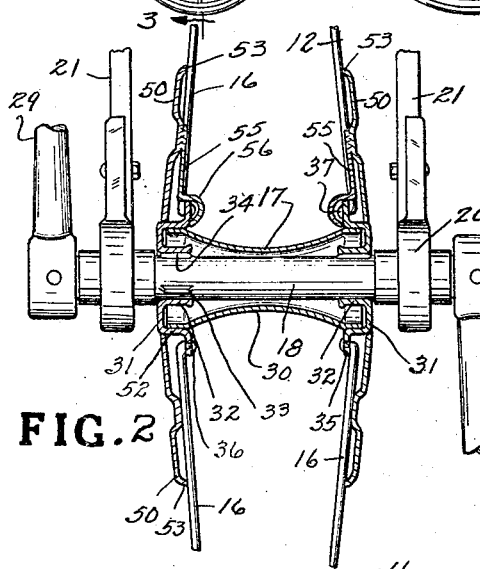
Figure 6:
Figure 4:
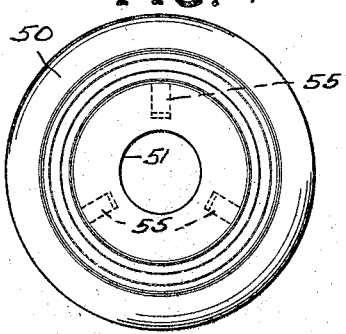
Figures 5, 7:
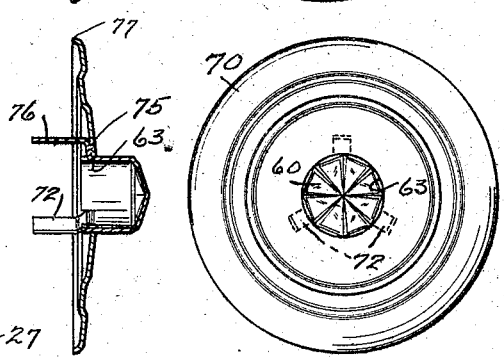
Figure 3:
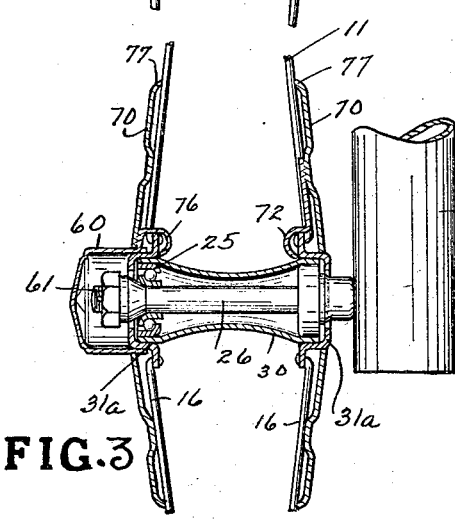

Fig. 1 is a side elevation of a juvenile vehicle, provided with wheels embodying my invention; Figs. 2 and 3 are radial sections through the hub portion of the wheels, as indicated by the lines 2—2 and 3—3, respectively, on Fig. 1; Figs. 4 and 5 are elevations of certain members of my improved hub; Figs. 6 and 7 are sections, on Figs. 4 and 5, respectively.

Referring in detail to the drawing, and especially to Fig. 1, I illustrate a child's vehicle 10 supported by suitable wheels 11 and 12. While the invention is illustrated in connection with a velocipede, it is equally adapted for use in other vehicles, such as toy automobiles, wagons and bicycles.

The wheels 11 and 12 comprise in general a rim 15, which is joined by suitable spokes 16 to a hub member 17 or 17a. The hub 17 of the front wheel 12 is mounted on an axle 18, supported in bearings 20, carried by the front fork 21 of the vehicle. The rear wheel hub member 17a is provided with suitable anti-friction bearings 25, which are interposed between the hub and a relatively stationary axle member 26, carried by the rear fork member 27 of the vehicle.

The front hub construction is such that the wheel 12 may be positively driven through the medium of suitable pedal operated cranks 29, which are rigidly secured to the axle member 18. The hub 17 comprises a tubular member 30, provided at its opposite ends with pressed metal cap members 31. Each cap 31 has an internal flange 32, which embraces the axle 18, and is drivingly retained thereon by suitable lugs 33 of the shaft which engage recesses 34 in the flange 32. The cap 31 has a radial flange 35 extending outwardly from the hub towards the rim 15. The spokes 16 are secured to the rim in the usual manner and pass through openings 36 in the flange 35 of the cap 31. The ends of the spokes which pass through the flange are riveted over, as at 37, thereby securing the spokes in place.

Each of the cap members 31 has an annular surface, parallel with the axis of the wheel, and extending some slight distance outwardly from the spokes. In children's vehicles, especially those which are manufactured to sell at a minimum price, it is highly desirable to provide a simple means of placing the spokes under tension after they have been secured to the hub and rim. For this purpose I prefer to provide a plate-like member 50, having a central opening 51 and arranged to be slid over an end portion 52 of the cap member 31. This annular disc or plate 50 is provided at its outer edges with an axially inwardly extending annular flange 53, arranged to engage the spokes 16 of the wheel and press them inwardly.

The plate 50 is secured in place by metallic lugs 55, which are welded or otherwise secured to the inner face of the disc. These lugs are so arranged that they extend inwardly from the disc toward the spokes, in a plane parallel to the axis of the hub. When the disc is placed upon the hub member 31, the inwardly extending portions 56 of these lugs engage the outer periphery of the annular rim 35, to which the spokes are secured. They are then bent downwardly and outwardly into contact with the inner surface of this rim, thereby securing the disc 50 in place with its flange 53, bearing against the spokes. It will be noted that the opening 51 of the disc is such that it permits a sliding movement of the disc on the member 31. Hence, when the ears 56 are bent against the inner surface of the flange 36, the rim 53 of the disc is drawn into contact with the spokes 16 and they are drawn inwardly by the disc 50, thereby increasing the tension on the spokes, as well as hiding from view the joints between the spokes and the hub ring 35.

In Figs. 3, 5 and 7 I illustrate a hub construction very similar to that described, but which is provided with a hub cap member 60, arranged to enclose the end 61 of the shaft 26. In this instance the hub is constructed similar to that described. However, instead of being drivingly secured to the shaft, it is rotatably mounted on the shaft by bearings 25, heretofore mentioned. This hub member is provided with an annular ring 70, similar in all respects to the ring 50, heretofore described.

The securing members which secure the ring or disc 70 to the wheel, are carried as an integral part of a hub cap 60, which projects through the opening 63 in the center of the disc 70, and is arranged to embrace the hub member 31a. The hub cap 60 is provided with a plurality of ears 72, which extend outwardly from the cap and are welded to the disc 70, as at 75. The ears 72 are bent inwardly from the disc 70, as at 76, forming lugs arranged to embrace the outer periphery of the ring 31a. After the disc 70 has been placed in position on the wheel, the lugs 76 are bent to engage the inner surface of the ring 31a. As heretofore explained in connection with Fig. 2, the arrangement is such that an annular rim 77 of the disc 70 is brought to bear against the outer surface of the spokes, thereby increasing the tension on the spokes.

It will be noted that the annular flanges 53 and 76 of the discs 50 and 70, respectively, are spaced some distance from the joint between the spokes and the hub. It has been found that this is highly advantageous in maintaining the spokes in tension, and aids in preventing the spokes from becoming loose, either at their junction with the flange 31 of the hub or at the rim. This is due to the fact that the pressure exerted by the annular flanges of the discs against the spokes dampens the vibration of the spokes, thereby lessening the possibility of their becoming loose at the junction points with the rim and hub.

I claim:

In a vehicle wheel, a hub through which the axle passes, a rim spaced apart from the hub, spokes secured to the rim and to the hub to maintain the spaced relation between the hub and the rim, said hub being provided with an end extending beyond the plane of said spokes, a dished plate provided with an opening and arranged to slidably embrace said extended end of the hub, a cup shaped member interposed between the plate and the hub to cover the end of the hub, and metal tongues carried by the cup member and secured to the plate and bent into contact with the hub to secure said plate and cap in place thereon, whereby the periphery of the dished plate is maintained in contact with the spokes.

In testimony whereof, I hereunto affix my signature.

HERMAN L. KRAEFT.